(No Model.)
T. A. EDISON.
INCANDESCING ELECTRIC LAMP.
No. 275,613. Patented Apr. 10, 1883.
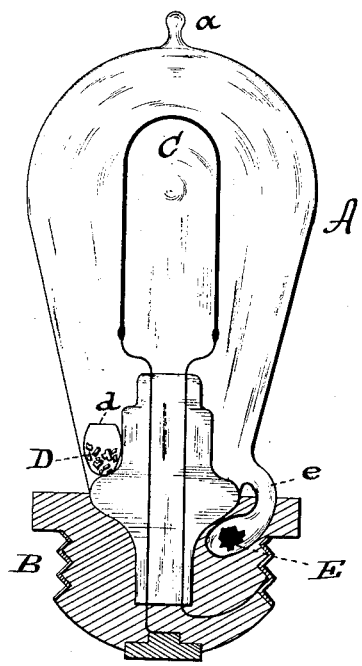
WITNESSES:
Thomas E. Birch.
D. W. Mott
INVENTOR:
T. A. Edison
BY Rich'd N. Dyer
ATTORNEY

UNITED STATES PATENT OFFICE.

THOMAS A. EDISON, OF MENLO PARK, NEW JERSEY.

INCANDESCING ELECTRIC LAMP.

SPECIFICATION forming part of Letters Patent No. 275,613, dated April 10, 1883.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Incandescing Electric Lamps, (Case 397;) and I do hereby declare that the following is a full and exact description of the same, reference being had to the accompanying drawings, and to the letters of reference marked thereon.

In my Patent No. 248,416 is described an incandescing electric lamp having crystals of naphthaline or other similar carbon compound placed in the globe for continuously supplying and repairing the waste of the more defective spots of the carbon filament. When the carbon is deposited, however, the hydrogen or other gas is set free and tends to impair the stability of the vacuum.

The object, therefore, that I have in view is to provide means for repairing continuously the waste of the carbon filament during the life of the lamp, and at the same time to maintain the stability of the vacuum. This I accomplish by providing the same lamp with tetrachloride or other chloride of carbon, or preferably with a mixture thereof, with naphthaline crystals or other similar compound of carbon volatilizable at low heat, and with a gas-absorbing heat. The mixture is decomposed into carbon and hydrochloric-acid gas, the carbon being deposited in the form of hard carbon on the defective spots of the carbon filament, and the hydrochloric-acid gas set free being absorbed by the gas-absorbing material, which is preferably charcoal, as such substance is capable of readily absorbing very many times its own bulk of the gas named without materially detracting from its capacity for the absorption of other gases, and will therefore take up, in addition to the hydrochloric-acid gas, all the hydrogen or other gas which may exude from the carbon or the clamps when they are heated. The crystals of chloride of carbon, or a mixture thereof with naphthaline, are preferably inclosed in a small spherical vessel of glass, perforated to permit the escape of the vapors therefrom, and secured by fusion or by a cement to the inside of the lamp, or they may be contained by a tube projecting from the globe. The gas-absorbing material is, as stated, preferably of charcoal, (a dense cocoa-nut charcoal being best for the purpose,) and is placed in a tube closed at its outer end and connected at its inner end with the lower part of the lamp-globe. This tube is heated to a high temperature when the lamp is exhausted, so as to drive the air out of the charcoal, and after the lamp is sealed the tube is bent down and inclosed partly or wholly by the molded base or collar of the lamp.

It is evident that this process of decomposing the vapor of a material containing carbon by the heat of the incandescing carbon filament of an electric lamp in the presence of a gas-absorbing material could be used for building up and equalizing the resistance of such filaments.

The foregoing will be better understood from the drawing, in which the lamp is represented in vertical section.

A is the globe of the lamp, exhausted and sealed off at *a*.

B is the molded base of the same.

C is the carbon filament within A, connected by leading-in wires passing through and sealed into the glass, with terminals on the base B.

D is the chloride of carbon, or mixture of that substance with naphthaline, inclosed in glass vessel *d*, secured by fusion to some point on the inside of the lamp.

E is the charcoal, inclosed in tube *e*, buried in the base B.

In my Patent No. 248,428 I have described a method of removing the gases occluded in the incandescing conductor, consisting in heating the conductor in a high vacuum in the presence of a material which will absorb the gases eliminated from such conductor, and I do not claim such invention herein.

What I claim is—

1. The within-described process of repairing the waste of or building up the incandescing carbon filament of an electric lamp, or equalizing the resistance of such filament, consisting in decomposing the vapor of a material containing carbon by the heat of the incandescing carbon filament in the presence of a material which will absorb the gas set free.

2. An incandescing electric lamp provided with a compound of carbon volatilizable at low heat and a gas-absorbing material, substantially as and for the purpose set forth.

3. The within-described process of repairing the waste of or building up the incandescing carbon filament of an electric lamp, consisting in decomposing the vapor of a mixture of chloride of carbon and a hydrocarbon by the heat of the incandescing carbon filament in the presence of a substance which will readily absorb the gas set free.

4. An incandescing electric lamp provided with a chloride of carbon vapor for depositing carbon upon the carbon filament by decomposing such vapor by the heat of the filament, substantially as set forth.

This specification signed and witnessed this 10th day of February, 1882.

THOMAS A. EDISON.

Witnesses:
RICHD. N. DYER,
WM. H. MEADOWCROFT.